United States Patent [19]

Brody

[11] 4,442,057

[45] Apr. 10, 1984

[54] MELT SPINNING PROCESS

[75] Inventor: Harry Brody, Harrogate, North Yorkshire, England

[73] Assignee: Imperial Chemical Industries Limited, London, England

[21] Appl. No.: 268,249

[22] Filed: May 29, 1981

[30] Foreign Application Priority Data

May 30, 1980 [GB] United Kingdom ............... 8017685
Jul. 29, 1980 [GB] United Kingdom ............... 8024694

[51] Int. Cl.$^3$ .............................................. D01D 1/04
[52] U.S. Cl. ............................... 264/176 F; 264/210.8; 525/425; 525/444
[58] Field of Search .......... 264/176 F, 210.8, 32.8 R, 264/; 260/33.4 P, 40 P; 525/444, 425

[56] References Cited

U.S. PATENT DOCUMENTS

| | | | |
|---|---|---|---|
| 3,778,410 | 12/1973 | Kuhfuss et al. | 260/33.4 P |
| 3,935,337 | 1/1976 | Taylor | 427/180 |
| 3,991,013 | 11/1976 | Fletcher | 260/32.8 R |
| 4,075,262 | 2/1978 | Schaefgen | 525/444 |
| 4,118,372 | 10/1978 | Schaefgen | 528/190 |
| 4,161,470 | 7/1979 | Calandann | 260/40 P |
| 4,223,125 | 9/1980 | Bier et al. | 264/176 R |
| 4,386,174 | 5/1983 | Cogswell et al. | 525/444 |

FOREIGN PATENT DOCUMENTS

| | | |
|---|---|---|
| 1185 | 3/1979 | European Pat. Off. . |
| 52-74017 | 6/1977 | Japan ............... 264/78 |
| 55-82150 | 10/1980 | Japan . |
| 900009 | 7/1962 | United Kingdom . |
| 1268908 | 3/1972 | United Kingdom . |
| 1487843 | 10/1977 | United Kingdom . |
| 2008598 | 6/1979 | United Kingdom . |
| 1553020 | 9/1979 | United Kingdom . |

Primary Examiner—Jay H. Woo
Attorney, Agent, or Firm—Cushman, Darby & Cushman

[57] ABSTRACT

A process of melt spinning a fibre-forming polymer particularly polyethylene terephthalate or poly-hexamethylene adipamide at a minimum wind up speed of 1000 meters per minute in which there is added to the fibre-forming polymer before spinning a small proportion of a polymer capable of forming an anisotropic melt in the temperature range at which the fibre-forming polymer may be melt spun whereby in the process there is suppression of wind up speed compared with the process carried out in the absence of the added polymer.

7 Claims, 9 Drawing Figures

MELT SPINNING PROCESS

This invention relates to the manufacture of synthetic fibres from thermoplastic polymers by melt spinning and drawing.

Some preliminary molecular orientation is induced in the fibres during melt spinning and this is increased by drawing to the degree required for any given fibre product. Drawing may be operated as a completely separate process after winding up and storing spun filaments or it may immediately follow spinning by forwarding spun filaments directly at controlled speed to a drawing process without interruption, or it may be still more closely integrated with spinning by omitting even intermediate speed control between spinning and drawing as for example in British Pat. No. 1 487 843.

Increasing the spinning speed increases the production rate but also increases the preliminary orientation, thereby reducing the extensibility of the filaments and the extent to which they can be drawn. This has various disadvantages in different contexts. In certain speed ranges it can result in unacceptable product variability at otherwise practicable speeds: in processes aimed at very high tenacity filaments it can reduce the tenacity achievable: and in spin-lag-draw processes the reduction in subsequent draw ratio reduces the decitex required at spinning, partially offsetting the production rate advantage of the higher spinning speed. Various means have been proposed to mitigate these disadvantages in the manufacture of fibres of polyethylene terephthalate by suppressing the preliminary orientation induced at spinning. These have included the use of hot tubes to reduce the cooling rate of the filaments below the spinneret (British Pat. No. 900 009): the use of a high speed forced flow fluid environment instead of an essentially quiescent fluid environment to bias the filament stretching to the higher temperature zone nearer the spinneret (British Pat. No. 1 268 908): and the use of branching agents such as pentaerythitol to modify the flow properties of the polymer (British Pat. No. 1 553 020).

According to this invention we provide a process of melt spinning a fibre-forming thermoplastic polymer in which there is added to the fibre-forming thermoplastic polymer a small proportion of a polymer capable of forming an anisotropic melt in the temperature range at which the thermoplastic polymer may be melt spun, and the polymers are then melt spun together in intimate mixture at a minimum wind up speed of 1 kilometer per minute whereby in the process there is a suppression of wind up speed compared with the process carried out in the absence of the added polymer.

We also provide fibres of a thermoplastic polymer containing a small proportion of a polymer capable of forming an anisotropic melt in the temperature range at which the thermoplastic polymer may be melt spun which have been spun at a minimum wind up speed of 1 kilometer per minute.

The process of the invention is suited to the melt spinning of the more common fibre-forming thermoplastic polymers such as polyesters, polyamides, copolyesters, copolyamides or polyolefines, for example polyethylene terephthalate and its copolyesters, polyepsilon—caproamide, polyhexamethylene adipamide, polypropylene and the like. The process is also suited to the melt spinning of other fibre-forming polymers such as acrylic polymers, vinyl chloride and vinylidene-chloride-based polymers, polystyrene, polyphenylene oxide and polyphenylene oxide/polystyrene blends, polysulphones and polyethersulphones, polyketones and polyetherketones, polyfluoroolefines, polyoxymethylenes, thermoplastic cellulosic polymers, and other biologically produced polymers, such as poly(hydroxybutyrate).

However, we have found that the process of the invention is particularly suited to the melt spinning of polyethylene terephthalate (PET) and polyhexamethylene adipamide (Nylon-6,6).

We prefer that the overlap of the anisotropic melt temperature range of the added polymer and the spinnable temperature range of the host polymer is at least 5° C. and preferably much more and we prefer to incorporate in the mixture between 0.1% and 10% by weight of the added polymer.

By "a polymer capable of forming an anisotropic melt" is meant either that the polymer forms such a melt when heated to a particular temperature range, characteristic of the polymer (this type is termed a "thermotropic" polymer) or can be induced to form such a melt by the application of shear to the melt. The latter state is characterised by the persistence of the anisotropic condition for a period of a second or two after the melt ceases to be sheared. This distinguishes it from the well-known observation that, for example, a polyethylene terephthalate melt will exhibit order when sheared by passing the melt through a tube. Such order disappears immediately the melt ceases to be sheared. Some polymers may show both thermotropic and shear-induced anisotropy. Polymers exhibiting such anisotropic melt behaviour have been called liquid crystal polymers and in what follows will be referred to as LC polymers. The fibre forming melt spinnable polymer to which the LC polymer is added will be referred to as the host polymer. Some tests for establishing whether a polymer shows anisotropic melt behaviour have been published in British Pat. No. 1 507 207.

Many patent specifications were published during the 1970's disclosing LC polymers. In general any known LC polymer can be chosen for addition to a host polymer according to the present invention provided that it can be processed in the same melt temperature range as the host polymer and provided that it does not react chemically with the host polymer to cause significant polymer degradation during melt processing.

For use with a polyester as host polymer, more particularly polyethylene terephthalate, we prefer one of the many anisotropic LC polyesters which have been described. In Examples 1 to 4 described below the LC polymers used are copoly chloro 1,4 phenylene ethylene dioxy 4,4' dibenzoate/terephthalate (CLOTH) and a copolymer of 6-oxy-2 naphthoyl and p oxybenzoyl moieties in the molar proportion 60%/40% (CO) and we have found that such LC polymers are particularly suitable.

For use with a polyamide as host polymer, more particularly Nylon-6,6, we have found—see Examples 5, 6 and 7 below—that CLOTH, CO and copoly ethylene terephthalate/p-oxybenzoate are particularly suitable.

The effect of LC polymers is that of wind up speed (WUS) suppression ie the properties of the spun fibre are those that would be obtained from a fibre spun at lower WUS. As the WUS increases in normal spinning where LC polymers are not used, certain properties of PET and Nylon-6,6 increase or decrease continuously.

These properties can therefore be used to measure the degree of WUS suppression. In the case of PET, the two major properties that have been used are birefringence and the extension-to-break of the spun fibre determined by an Instron. The birefringence normally increases smoothly with WUS, so that a reduction of birefringence at a given WUS is indicative of WUS suppression. The extension decreases with WUS, so that in this case an increase of extension is indicative of WUS suppression.

For PET there is another property of spun fibres which passes through a maximum with WUS, and which is also governed by the WUS, and this is spun yarn boiling water shrinkage (SYS). This cannot be related quite so quantitatively as birefringence and extension to express the degree of WUS suppression, but the semi-quantitative effects are similar. The results given in Table 3 and FIG. 1 below show that the SYS at a given WUS is considerably changed, resulting in the inverted 'U' shape of the SYS/WUS curve being displaced to the right together with some change of scale.

For Nylon-6,6 the extension-to-break can be used in a similar manner to PET. On the other hand there are complications in using the birefringence since the birefringence of spun fibres tends to level out at high WUS where the effectiveness of LC polymers is greatest, and also there are post spinning increases in birefringence which complicate the measurement. For these reasons, birefringence has not been used for Nylon-6,6. Instead, another parameter has been chosen which increases smoothly with WUS, namely the true stress at 50% strain derived from the Instron stress/strain curve of the spun fibre.

Figure 1:
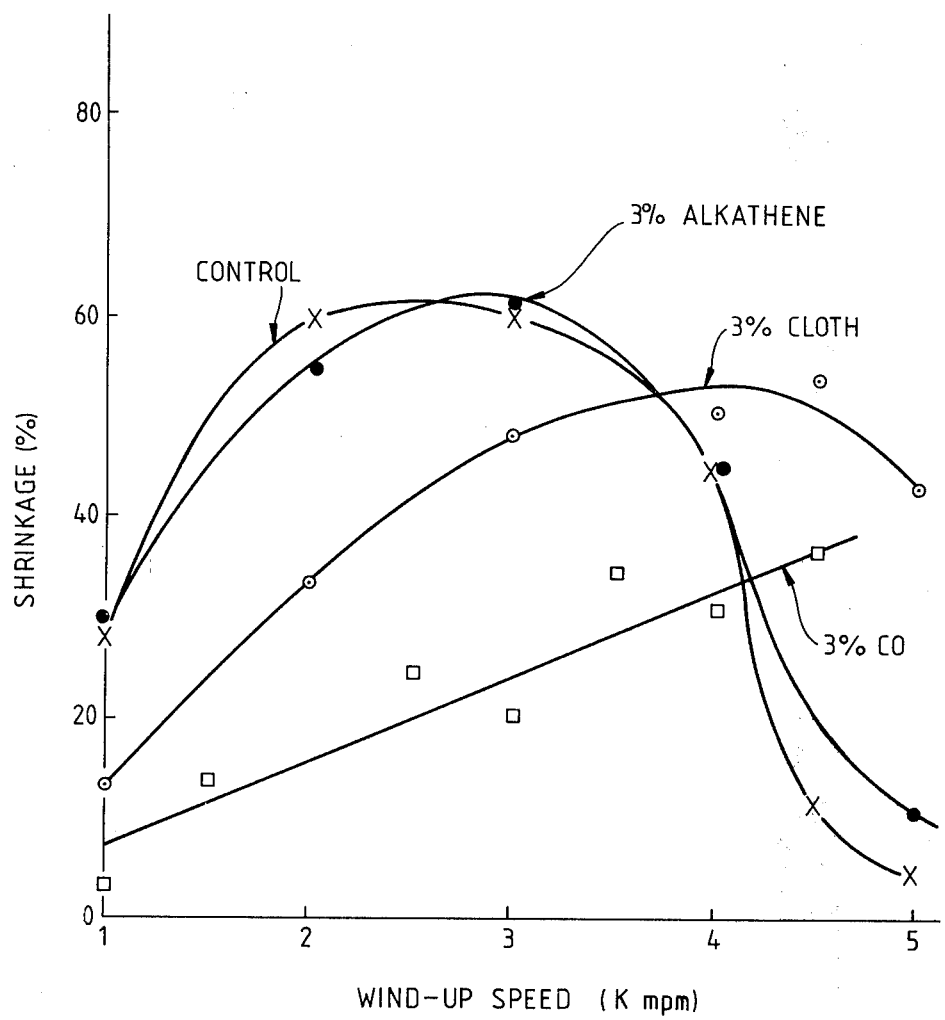
FIG. 1 is a plot of shrinkage versus wind-up speed for melt spun polyethylene terephthalate filaments.

This invention will now be described with reference to the following Examples:

EXAMPLES 1 & 2

In these Examples an LC polyester-copoly chloro 1,4 phenylene ethylene dioxy 4,4' dibenzoate/terephthalate (CLOTH), prepared according to example 3 of US 3 991 013 was used. This polymer had an inherent viscosity of 0.56 dl/g at 25° C. in a 0.5% solution in a solvent comprising 30% trifluoracetic acid and 70% dichloromethane. The polymer melted in the range 220°/230° C. to give a melt which was anisotropic up to 320° C. as observed in a Leitz hot stage fitted to a Leitz SM POL model polarising microscope. This anisotropic melt temperature range is admirably suited to spinning with polyethylene terephthalate host polymer at temperatures in the range 270° C. to 300° C.

In Example 1 and Example 2 the LC polyester was compounded at 3% and 6% concentrations by weight respectively into a commercial grade of polyethylene terephthalate host polymer. Compounding was done in an MPM single screw extruder with a 32:1 L/D ratio operating at 40 rpm with a feed zone at 230° C., barrel temperatures at 280°, 270°, 265° and 275° C. and die temperature at 250° C. extruding ⅜" diameter lace which was water quenched and cut. As a control, polyethylene terephthalate without addition of LC polyester was extruded by the same process. The intrinsic viscosity of the control after extrusion was 0.59 measured in trichloracetic acid.

These polymers were melt spun through 15 thou spinneret holes at 40 grams per hour per hole and cooled in ambient air with no deliberate quenching apparatus. After cooling, the filaments so formed, were wound up at wind up speeds (WUS) of 1, 2 and 4 kilometers per minute without adjustment of spinning rate so that the higher wind up speeds yielded finer filaments. Melt spinning temperatures together with the percentage extensibility of the resultant filaments are recorded in Table 1. The intrinsic viscosity of the control after spinning was 0.58, that of the 3% blend was 0.56 and that of the 6% blend was 0.54.

In these Examples and the control the wind up speed suppression was compared simply by the extensibility of the filaments as determined in an Instron. For this and the following Examples the gauge length used was 10 cam and the strain rate was 200% per minute.

If a spun filament has a percent extension-to-break of E, then the maximum draw ratio to which it can subsequently be subjected is roughly (1+E/100). If a second spun filament has a larger extension-to-break E' then it can be subjected to a larger draw ratio, roughly (1+E'/100). To make drawn filaments of equal decitex d at these maximum draw ratios the spun filaments must therefore have decitexes of d (1+E/100) and d(1+E'/100) respectively. If both filaments are spun at the same speed their production rates are proportional to these decitexes and the percentage increase in productivity of the second filament is $$\frac{(1 + E'/100) - (1 + E/100)}{(1 + E/100)} \times 100\%$$

This is the function listed in Table 1 and the % increase in productivity.

TABLE 1

| WUS (K mpm) | % LC POLYMER | MELT SPINNING TEMP (°C.) | EXTENSION (%) | AVERAGE $\left(1 + \frac{E}{100}\right)$ | INCREASE IN PRODUCTIVITY (%) |
|---|---|---|---|---|---|
| 1 | Nil | 282 | 320 | 4.3 | — |
|  |  | 292 | — |  |  |
|  |  | 300 | 340 |  |  |
|  | 3 | 175 | 360 | 4.8 | 12 |
|  |  | 282 | 400 |  |  |

TABLE 1-continued

| WUS (K mpm) | % LC POLYMER | MELT SPINNING TEMP (°C.) | EXTENSION (%) | AVERAGE $\left(1 + \dfrac{E}{100}\right)$ | INCREASE IN PRODUCTIVITY (%) |
|---|---|---|---|---|---|
|  |  | 287 | 360 |  |  |
|  | 6 | 273 | 400 | 4.8 | 12 |
|  |  | 290 | 360 |  |  |
|  |  | 294 | 367 |  |  |
| 2 | Nil | 282 | 200 | 3.0 | — |
|  |  | 292 | — |  |  |
|  |  | 300 | 200 |  |  |
|  | 3 | 275 | 220 | 3.5 | 17 |
|  |  | 282 | 250 |  |  |
|  |  | 287 | 250 |  |  |
|  |  | 300 | — |  |  |
|  | 6 | 272 | 290 | 4.0 | 33 |
|  |  | 290 | 300 |  |  |
|  |  | 294 | 300 |  |  |
| 4 | Nil | 292 | 73 | 1.7 | — |
|  |  | 300 | 70 |  |  |
|  | 3 | 287 | 125 | 2.2 | 30 |
|  |  | 294 | 125 |  |  |
|  |  | 300 | 105 |  |  |
|  | 6 | 294 | 175 | 2.7 | 59 |

It is evident from the table that the available increase in productivity rises with increasing amount of LC polymer and with increasing spinning speed. At 4 kilometers per minute a 6% by weight addition affords about 60% increase in productivity.

EXAMPLES 3 & 4

In the experiments described below, three percent concentration by weight of three different polymers were compounded with a commercial grade of polyethylene terephthalate (PET) host polymer in an MPM single screw extruder with a 32:1 L/D ratio operating at 40 rpm with a feed zone at 230° C., barrel temperatures at 280°, 270°, 265° and 275° C. and die temperature 250° C. extruding ⅜" diameter lace which was water quenched and cut. The three added polymers were:

A. A commercial grade of polyethylene (PE) marketed as Alkathene Grade 23 which had a melt flow index of 200. This grade was chosen because it has a melt viscosity of 12 Ns/m² at $10^4$ N/m² which is very similar to that of the LC polymer described in B below, at 4.5 Ns/m² at $10^4$ N/m².

B. A sample of copoly chloro 1,4 phenylene ethylene dioxy 4,4' dibenzoate/terephthalate (CLOTH), prepared according to example 3 of U.S. Pat. No. 3,991,013. This polymer had an inherent viscosity of 0.56 dl/g at 25° C. in a 0.5% solution in a solvent comprising 30% trifluroacetic acid and 70% dichloromethane. The polymer melted in the range 220°/230° C. to give a melt which was anisotropic up to 320° C. as observed in a Leitz hot stage fitted to a Lietz SM POL model polarising microscope. This anisotropic melt temperature range is admirably suited to spinning with polyethylene terephthalate host polymer at temperatures in the range 270° C. to 300° C.

C. A sample of a copolymer of 6-oxy-2 naphthoyl and p oxybenzoyl moieties in the molar proportion 60%/40% (CO) was prepared according to Example V of US 4 161 470. This polymer had an intrinsic viscosity of 5.6 dl/g at 60° C. in a 0.1% solution of penta fluoro phenol. The polymer melted at about 300° C. to give an anisotropic melt as observed in a Lietz SM POL hot stage polarising microscope.

The intrinsic viscosities of the polymer compounds and resultant fibres, all measured in trichloracetic acid, were as shown in Table 2.

TABLE 2

|  | Polymer | Fibre |
|---|---|---|
| PET (Control) | 0.625 | 0.596 |
| PET + 3% Alkathene (Comparative Example) | 0.611 | 0.568 |
| PET + 3% CLOTH (Example 3) | 0.600 | 0.561 |
| PET + 3% CO (Example 4) | 0.600 | 0.573 |

The three polymer compounds and the PET control were all melt spun through 9 thou spinneret holes at 98 grams/hr/hole and cooled in ambient air with no deliberate quenching apparatus. After cooling, the filaments so found were wound up at a variety of speeds and their optical birefringences and shrinkages in boiling water measured and are recorded in Table 3.

Load/extension curves were prepared for the filaments. The percent extension to break was measured on each load/extension curve and was used as an estimate of the draw ratio to which the filament could subsequently be drawn.

Table 3 shows the increase in spinning productivity calculated from the Instron as discussed in Examples 1 and 2.

In addition, samples of the melt spun filaments were actually hot drawn as much as possible by a standard process using a hot pin at 90° C. and a hot plate at 180° C. The draw ratios were increased in steps of 0.1 and the maximum runnable draw ratio was determined for each filament. These maximum draw ratios are also shown in Table 3 along with % increase in spinning productivity they imply.

It can be seen that for 3% CLOTH the increase in productivity calculated from the increase in maximum draw ratio compared with the control does in fact agree approximately to the increase in productivity predicted from the Instron extension.

TABLE 3

| | WUS (K mpm) | BIREFRINGENCE (× 10³) | BOILING WATER SHRINKAGE (%) | EXTN (%) | $1 + \frac{E}{100}$ | INTRUSION INCREASE IN PRODUCTIVITY (%) | MAX HOT DRAW RATIO | DRAWING INCREASE IN PRODUCTIVITY (%) |
|---|---|---|---|---|---|---|---|---|
| CONTROL | 2 | 13.2 | 59.9 | 274 | 3.74 | — | 3.8 | — |
| | 3 | 31.7 | 60.6 | 169 | 2.69 | — | 2.5 | — |
| | 4 | 57.8 | 45.4 | 105 | 2.05 | — | 2.0 | — |
| | 4.5 | 73.2 | 11.1 | 77 | 1.77 | — | — | — |
| | 5 | 91.7 | 4.7 | 63 | 1.63 | — | 1.5 | — |
| 3% ALKATHENE (COMPARATIVE EXAMPLE) | 2 | 13.2 | 55.6 | 215 | 3.15 | | 3.8 | |
| | 3 | 29.0 | 61.9 | 132 | 2.32 | | 2.4 | |
| | 4 | 53.1 | 45.4 | 80 | 1.80 | | 1.9 | |
| | 5 | 69.6 | 10.9 | 53 | 1.53 | | 1.5 | |
| 3% CLOTH (EXAMPLE 3) | 2 | 9.9 | 33.3 | 358 | 4.58 | 22 | 4.3 | 13 |
| | 3 | 19.4 | 48.1 | 230 | 3.30 | 23 | 3.2 | 28 |
| | 4 | 31.0 | 50.6 | 150 | 2.50 | 22 | 2.5 | 25 |
| | 4.5 | — | 54.2 | 119 | 2.19 | 24 | — | — |
| | 5 | 43.3 | 42.9 | 112 | 2.12 | 30 | 2.0 | 33 |
| 3% CO (EXAMPLE 4) | 2 | 9.4 | 5.0 | 250 | 3.50 | — | | |
| | 2.5 | 11.8 | 24.9 | 272 | 3.72 | — | | |
| | 3 | 14.2 | 20.4 | 180 | 2.80 | 4 | | |
| | 3.5 | 17.7 | 34.7 | — | — | — | | |
| | 4 | 19.2 | 31.1 | 143 | 2.43 | 19 | | |
| | 4.5 | 27.4 | 37.2 | 142 | 2.42 | 37 | | |

In Example 3 at 2 K mpm and 4 K mpm wind up speeds, these estimates of productivity increase compare favourably within experimental error with the results in Example 1 above. These estimates are all positive but not in very close numerical agreement.

Figure 2:
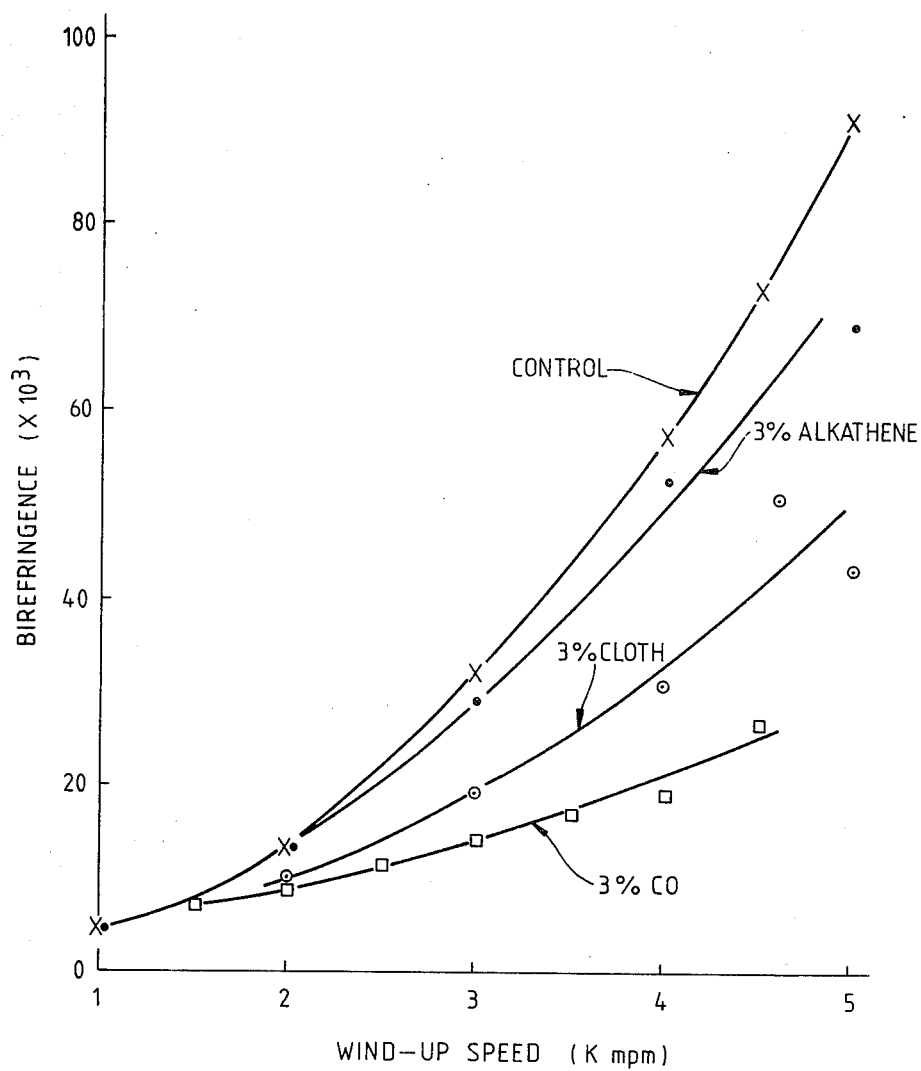
FIG. 2 is a plot of birefringence versus wind-up speed for melt spun polyethylene terephthalate filaments.

In the Comparative Example, the addition of 3% of alkathene, which is not an LC polymer, leads to no increase in attainable draw ratio, even though at the highest wind up speed it appears to have caused some change in the birefringence and the shrinkage. By contrast in Examples 3 and 4 both CLOTH and CO, which are LC polymers, cause substantial birefringence and shrinkage changes and hence wind up speed suppression as well as substantial productivity increases. However in these Examples CLOTH and CO had clearly different effects in modifying the PET. FIGS. 1 and 2 display the shrinkage and birefringence data of Table 3 plotted against wind up speed. Incorporation of 3% CO causes birefringence suppression of almost 50%.

EXAMPLES 5, 6 & 7

In the experiments described below, three different LC polymers and, for comparison, a conventional plasticiser were imtimately mixed with Nylon 6,6, as host polymer. The polymers were:

A. (Used in Example 6) copoly chloro 1,4, phenylene ethylene dioxy 4,4' dibenzoate/terephthalate (CLOTH) prepared according to Example 3 of U.S. Pat. No. 3,991,013. It had an inherent viscosity of 1.07 dl/g at 25° C. in a 0.5% solution of 30% trifluoroacetic acid and 70% dichloromethane. The polymer melted in the range 215°/225° C. to give an anisotropic melt as observed in a Leitz hot stage fitted to a Leitz SM POL model polarising microscope. It had a melt viscosity of 50 Ns/m² at 10⁴N/m² and 270° C. (Note this is a different sample of CLOTH to that used in Examples 1, 2 and 3).

B. (Used in Example 7) copoly 4-hydroxy benzoic acid/6-hydroxy-2 naphthoic acid (CO), prepared according to Example V of U.S. Pat. No. 4,161,470. It had an inherent viscosity of 5.2 dl/g at 60° C. in a 0.1% solution of penta fluoro phenol. The polymer melted at about 260° C. to give an anisotropic melt. It had a melt viscosity of 600 Ns/m² at 10⁴N/m² and 270° C. (Note this is a different sample of CO to that used in Example 4).

C. (Used in Example 5) copoly ethylene terephthalate/p-oxybenzoate (X7G). This was prepared according to W J Jackson and H F Kuhfuss, J Poly Sci, (Poly Chem Edition), 2043, 14 (1976) and U.S. Pat. Nos. 3 778 410 and 3 084 805. It had an inherent viscosity of 0.34 dl/g at 25° C. in a 1% solution of dichloroacetic acid. The polymer gave an anistropic melt at 188° C. It had a melt viscosity of 220 Ns/m² at 10⁴N/m² and 270° C.

D. Used in Comparative Example) SANTICIZER—a solid sulphonamide plasticiser sold by Monsanto.

The above polymers were blended separately in the weight concentrations mentioned below with Imperial Chemical Industries Limited SGS grade Nylon 66 on a PLASTON single screw extruder with a 1.5 inch diameter "nylon screw" of 30:1 L/D ratio. The screw feed was 50 rpm with the feed zone at about 290° C. and observed barrel temperatures from feed zone to die end of 297° C., 298° C., 287° C., 294° C. and 299° C. for CLOTH and X7G and slightly lower at 283° C., 290° C., 286° C. and 272° C. for the CO and SANTICIZER. A lace of 0.25 inch diameter was extruded into a water bath by a haul off and thence to a lace cutter. The average output rate was 123 gpm.

As a control, Nylon 66 without addition of polymer, was also passed through the extruder.

The blend formed with SANTICIZER served as a comparative Example.

Before blending, the LC polymers CLOTH, CO and X7G, were dried at 60°–70° C. overnight in a vacuum oven. The Nylon 66 was also dried overnight in a vacuum oven at 90° C. 1 kg batches were prepared, the first 200 grams of which were dumped to clear out the remains of the previous batch.

The blends so formed were spun on a simple rod spinner through 15 thou spinneret holes without quench air or a steam conditioning tube. The spinning throughput was 34 g/hr/hole. The filaments so formed were wound up at various wind up speeds in the range 1 to 5 k mpm.

A number of difficulties had to be overcome in order to achieve a good spinning technique for Nylon 66. It was found that in spite of pre-drying the nylon overnight the preparation of a candle at 240° C. (10 minutes) apparently caused a considerable reduction in molecular weight as evidenced by a very watery extrudate. It was decided to spin the chip directly, and this proved to be successful and time-saving. The pack could be used a number of times as long as it was flushed out with polypropylene at the end of a spin (at first residual nylon left in the pack degraded even when the spin was finished, and the pack could only be used once).

Another difficulty arose because a steam conditioner was not used. When the yarn was wound directly on to the capstan at moderate WUS it spontaneously extended during the spin and was thrown outwards from the capstan by centrifugal force, making it impossible to wind up. This did not seem to happen at higher WUS, but since the LC polymers effectively lower the WUS it was imperative to solve this problem. It was found that the difficulty could be avoided if spin finish was omitted and the nylon was wound up dry directly on to the capstan. This meant that the yarn could not be rewound on a bobbin but had to be removed as a hank for subsequent testing. This prevented an eventual evaluation of hot drawing, as was possible for polyethylene terephthalate in Example 3 above.

On the other hand there was an unexpected major benefit. For Instron testing it was necessary to dissect portions of the hank and determine the decitex of each portion individually by weighing. The decitex used was 20–100 times the normal rather low yarn decitex, which was limited by throughput/WUS considerations. This led to excellent reproducibility on Instron testing by avoiding errors due to decitex variability along the yarn.

There was concern that omitting the application of moisture during spinning might lead to an unstable ageing situation where the birefringence of the nylon gradually changed with time. However, we established that at 3.6 K mpm the birefringence of a sample chopped from the spinning threadline above the conditioner and immersed in Euparol on a slide rose to 75% of the package value in 3 minutes, and reached the package value within 3 hours. It is well known that dry nylon absorbs moisture from the air very rapidly. Chappel et al have found that freshly spun or dried nylon of 90 $\mu$ diameter reached its equilibrium moisture content after 3 hours when exposed to the ambient atmosphere, attaining 80% of this after one hour (see J Appl Chem, 14, 12 (1964)). Our maximum spun diameter was only about 25 $\mu$. To be completely sure, we used a minimum lapse time of one day after spinning before testing, during which the nylon was kept in a conditioned laboratory at 50% RH and 70° C.

A final problem to settle was the extrusion temperature. As high a temperature as possible was required to reduce the pack pressure and ensure activation of the LC polymer in the threadline. On the other hand, too high a temperature degrades the nylon and LC polymer. A temperature of 302° C. was found to be a good compromise.

Figure 3:
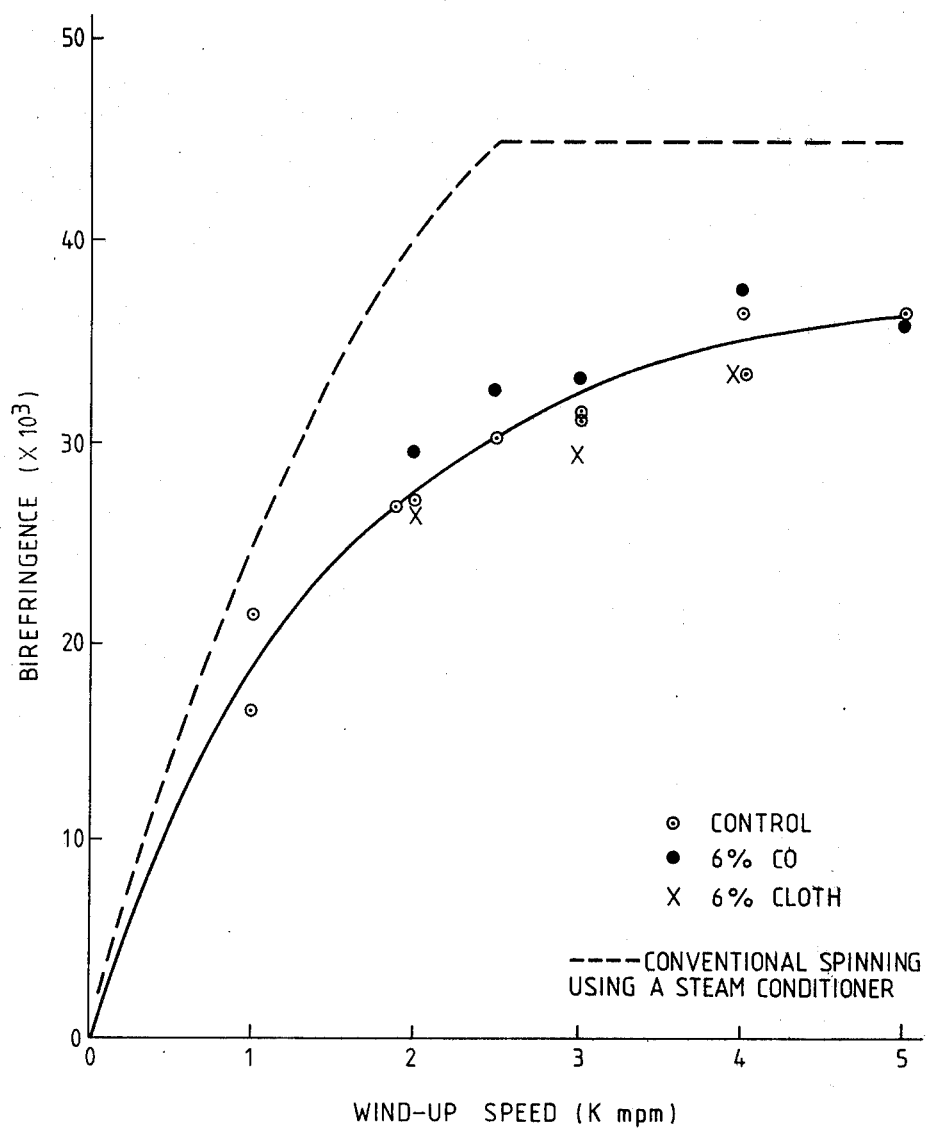
FIG. 3 is a plot of birefringence versus wind-up speed for nylon filaments.

Various properties, particularly those that correlate with WUS, were measured. The spun yarn boiling water shrinkage (SYS) of nylon is very low ie only a few percent and can therefore be rejected as being of no experimental value. The use of birefringence as the basis for comparing the invention Examples with the control and the comparative Example is complicated by post spinning increases and because this property tends to level out at higher WUS where LC polymers exert their greatest effect, so that the magnitude of any change is reduced. For completeness, however, we show in FIG. 3, graphs of Birefringence against WUS for the results obtained in Examples 6 and 7 and the Control and for products obtained by a conventional spinning process utilising a steam conditioner. The graphs show that there is no significant difference between the LC polymers and the control.

We have found, however, that stress-strain curves offer a satisfactory basis for comparing products obtained by the Examples with the control products and products produced in the comparative Example. In general the stress at a given strain increases fairly uniformly and so the true stress at a fixed strain of 50% provides a good basis for comparison between the various products.

Figure 4:
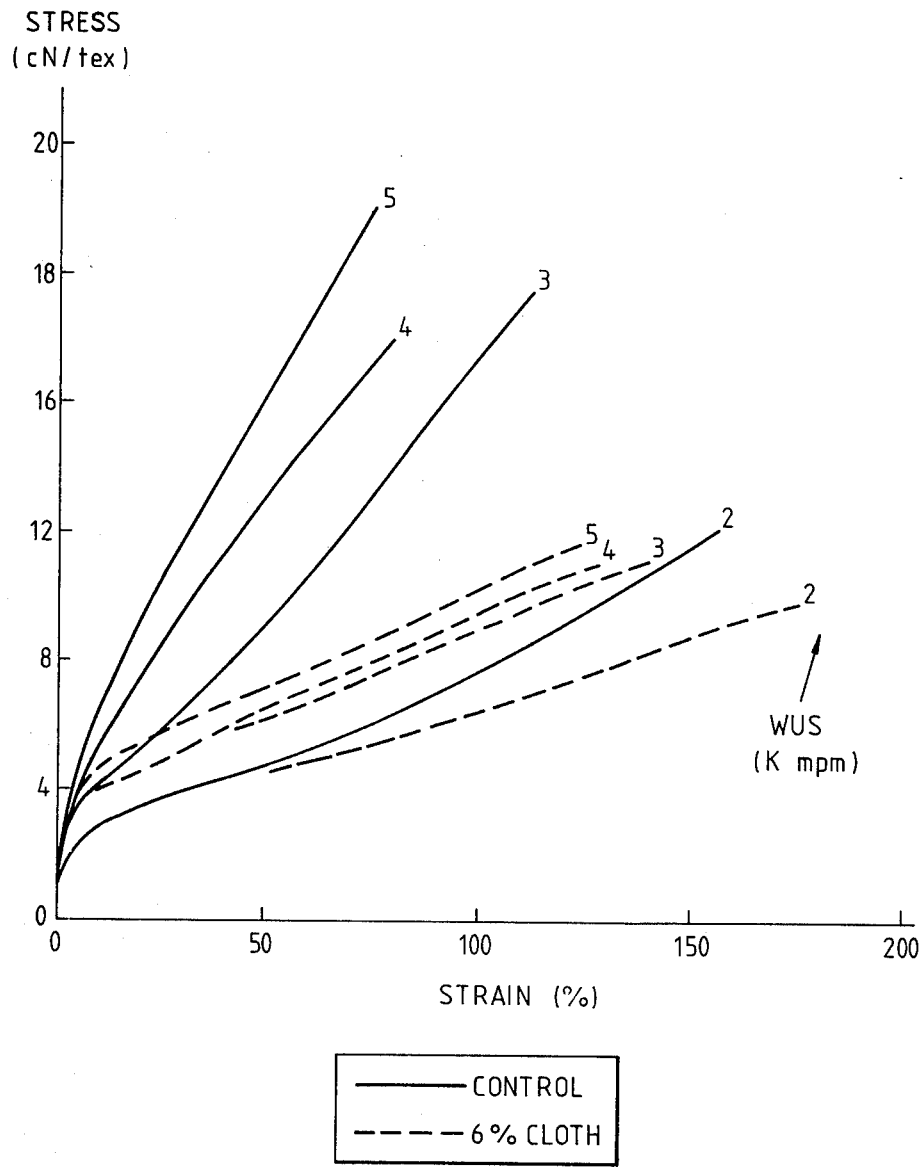
FIG. 4 is a stress-strain curve for nylon filaments at various wind-up speeds.

The effect of 6% CLOTH on the specific stress-strain curves is illustrated in FIG. 4. Two different controls were used, and the true stress results for CLOTH, CO, X7G and SANTICIZER are given in Table 4 and FIGS. 5 and 6. For comparison the curves have all been normalised in terms of equivalent lower WUS, using the smooth curves shown in FIGS. 5 and 6 and the results are shown in FIG. 7. The amount of SANTICIZER remaining in the Fibre after spinning was analysed and found to be 5.4% and so a small amount was lost at spinning.

TABLE 4

| POLYMER | INTERNAL REFERENCE | WUS (K mpm) | TRUE STRESS AT 50% STRAIN (cN/TEX) | EQUIVALENT LOWER WUS (K mpm) | EXTENSION (%) | PRODUCTIVITY INCREASE (%) |
| --- | --- | --- | --- | --- | --- | --- |
| (CONTROL) | 9138/24/47 | 1 | 5.4 | — | 200 | — |
|  |  | 2 | 7.1 | — | 156 | — |
|  |  | 3 | 13.5 | — | 110 | — |
|  |  | 4 | 19.8 | — | 78 | — |
|  |  | 5 | 24.6 | — | 75 | — |
| (EXAMPLE 5) 3% X7G | 9138/24/52 | 1 | 6.0 | 1 | — | — |
|  |  | 2 | 9.6 | 2 | 131 | — |
|  |  | 3 | 13.3 | 2.7 | 117 | — |
|  |  | 4 | 16.6 | 3.4 | 89 | — |
| (EXAMPLE 6) 3% CLOTH | 9138/24/49 | 1 | 6.6 | 1 | — | — |
|  |  | 2 | 9.0 | 1.9 | 182 | 10 |
|  |  | 3 | 12.7 | 2.6 | 130 | 10 |
|  |  | 4 | 16.3 | 3.2 | 103 | 14 |
|  |  | 5 | 17.7 | 3.6 | 87 | — |
| (EXAMPLE 6) 6% CLOTH | 9138/24/50 | 2 | 6.7 | 1.4 | 175 | 7 |
|  |  | 3 | 9.3 | 1.8 | 143 | 16 |
|  |  | 3.5 | 9.0 | 2.0 | 159 | — |
|  |  | 4 | 9.9 | 2.1 | 128 | 28 |

TABLE 4-continued

| POLYMER | INTERNAL REFERENCE | WUS (K mpm) | TRUE STRESS AT 50% STRAIN (cN/TEX) | EQUIVALENT LOWER WUS (K mpm) | EXTENSION (%) | PRODUCTIVITY INCREASE (%) |
|---|---|---|---|---|---|---|
| (CONTROL) | 9138/24/57 | 5 | 10.8 | 2.2 | 122 | 27 |
|  |  | 1 | 6.9 | — | 198 | — |
|  |  | 2 | 11.3 | — | 140 | — |
|  |  | 3 | 17.7 | — | 108 | — |
|  |  | 4 | 27.0 | — | 66 | — |
| (EXAMPLE 7) 6% CO | 9138/24/58 | 2 | 6.0 | 0.8 | — | — |
|  |  | 2.5 | 6.3 | 1.0 | 177 | 22** |
|  |  | 3 | 8.8 | 1.3 | 165 | 28 |
|  |  | 3.5 | 9.6 | 1.5 | 148 | 33** |
|  |  | 4 | 9.6 | 1.7 | 136 | 42 |
| (COMPARATIVE EXAMPLE) 6% SANTCIZER | 9138/24/59 | 1 | 6.5 | 1 | — | — |
|  |  | 2 | 12.0 | 2 | 125 | — |
|  |  | 3 | 15.9 | 2.7 | 90 | — |
|  |  | 4 | 20.2 | 3.5 | 72 | — |
|  |  | 5 | 28.2 | 4.2 | 62 | — |

Figure 5:
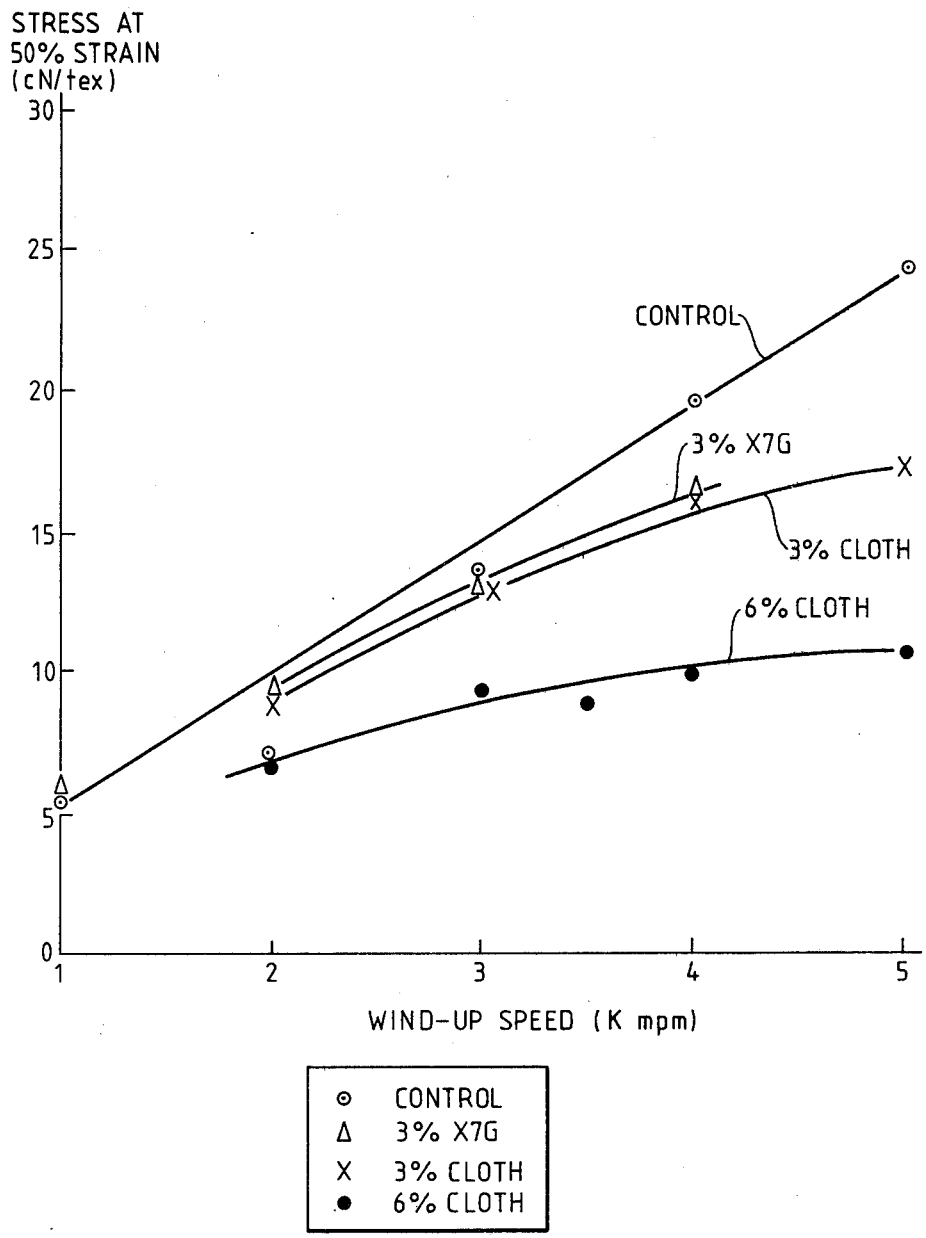
FIGS. 5 and 6 are plots of stress versus wind-up speed for nylon filaments.
Figure 6:
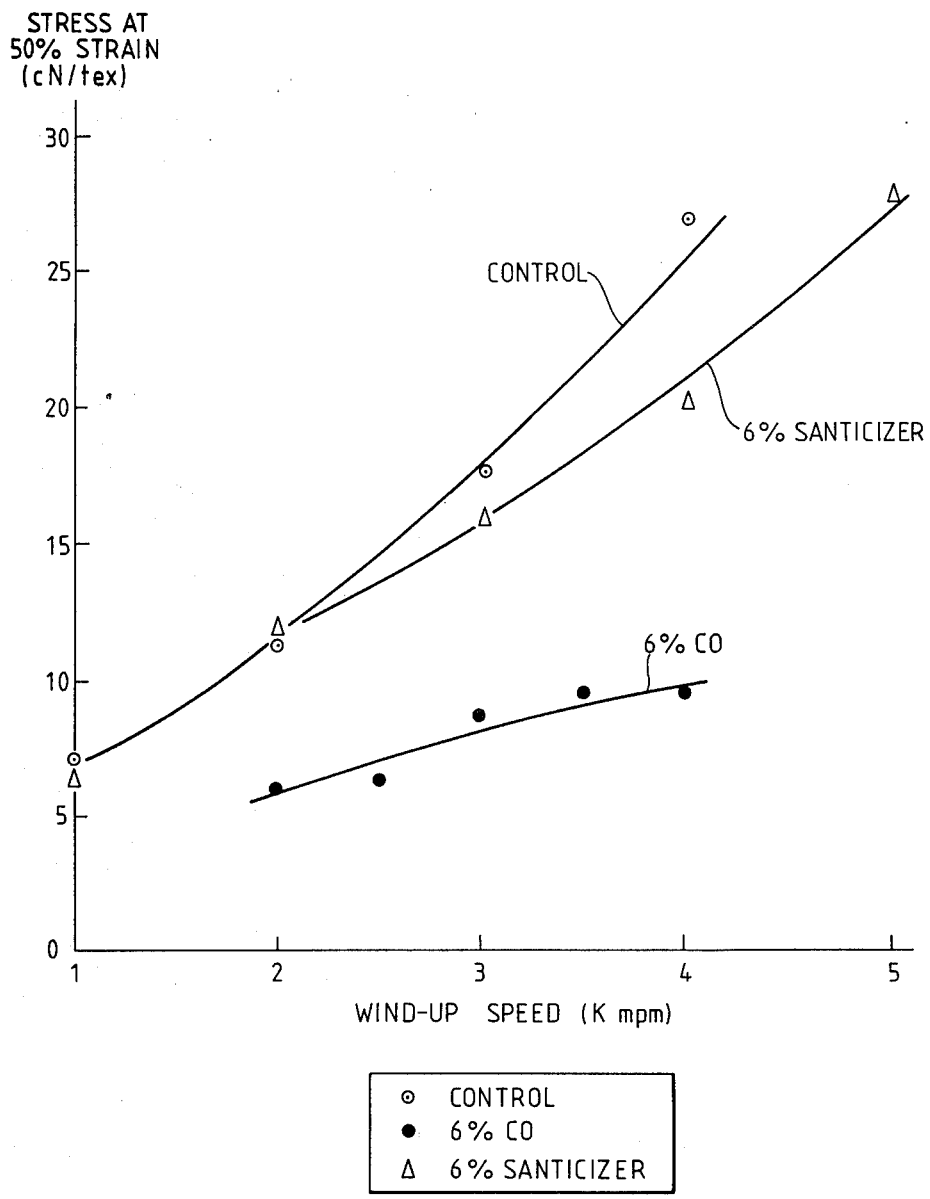
Figure 7:
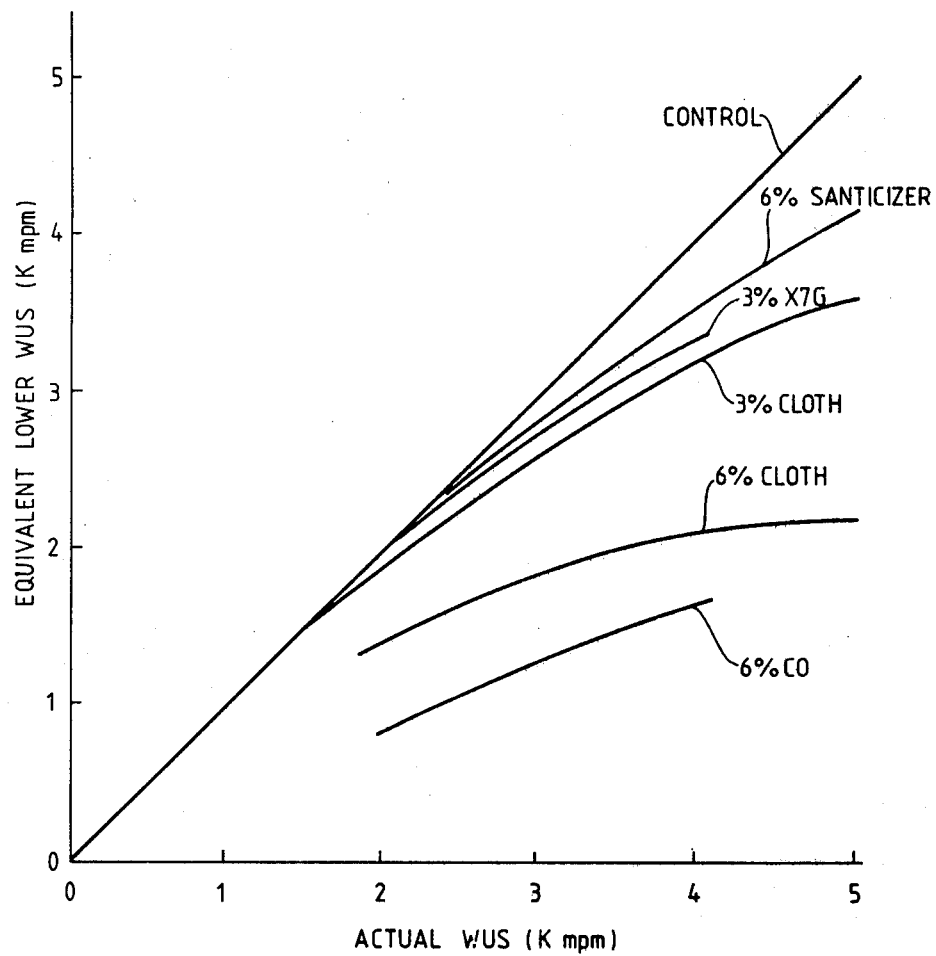
FIG. 7 is a plot of equivalent lower wind-up speed versus actual wind-up speed for nylon filaments.
Figure 8:
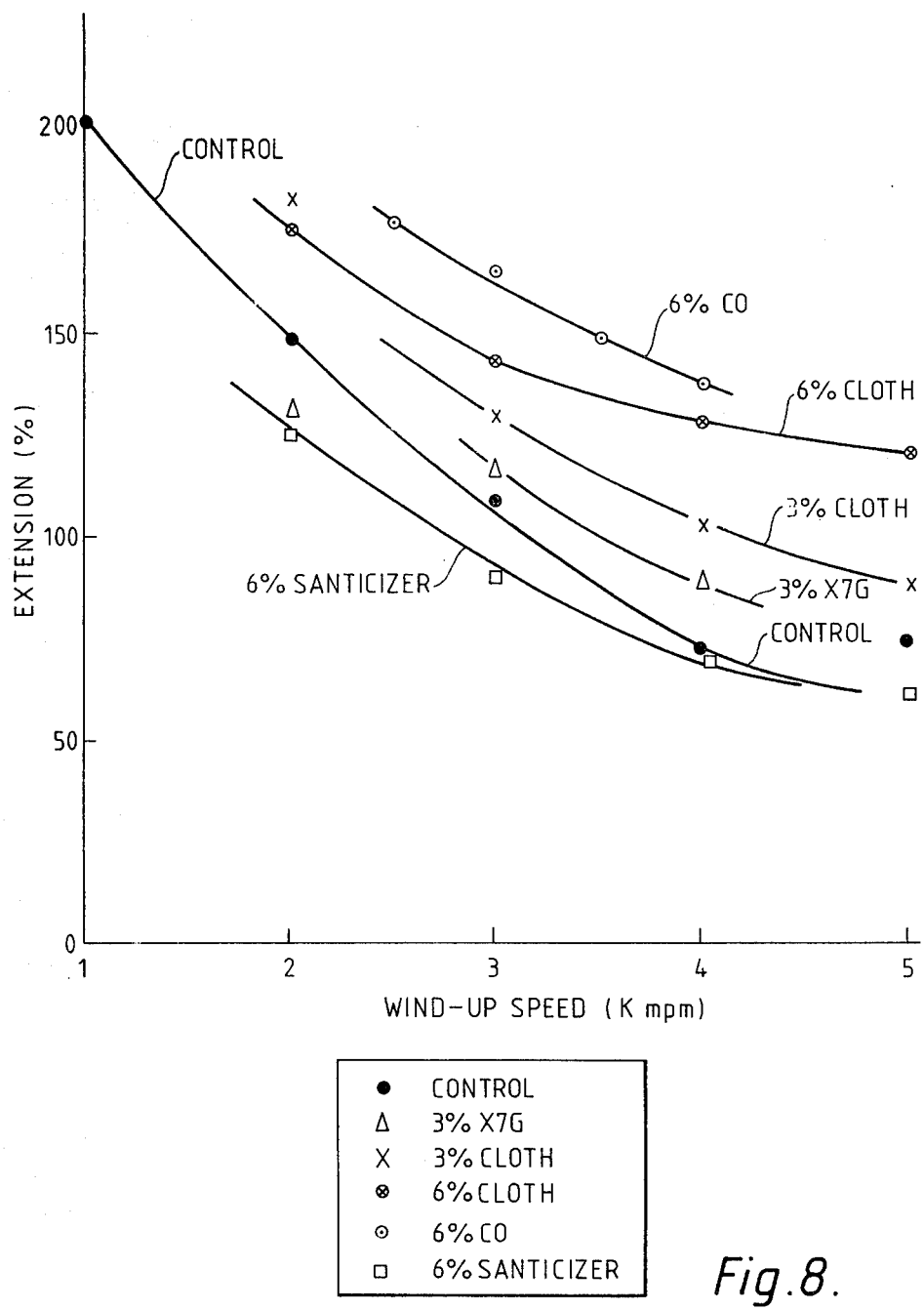
FIG. 8 is a plot of extension versus wind-up speed for nylon filaments.

*Calculated from curves in FIGS. 5 and 6.
**Calculated from curve in FIG. 8.

It is apparent that LC polymers become increasingly effective at higher WUS. The effect of 6% CO in FIG. 7 is particularly striking, with 4 K mpm being reduced by over 50%.

Table 5 which follows shows the relative viscosity (RV) of the various blends in both chip and fibre form. In particular this Table establishes that the effects are not due to degradation of the nylon since the RV's of the yarns containing LC polymers are essentially the same as the control.

TABLE 5

|  | BLEND TYPE | RV |
|---|---|---|
| CHIP | (CONTROL) | 43.2 |
|  | 3% X7G | 45.3 |
|  | 3% CLOTH | 49.3 |
|  | 6% CLOTH | 46.8 |
|  | (CONTROL) | 39.7 |
|  | 6% CO | 36.5 |
| FIBRE | (CONTROL) | 37.1 |
|  | 3% X7G | 31.1 |
|  | 3% CLOTH | 37.1 |
|  | 6% CLOTH | 35.7 |
|  | (CONTROL) | 36.8 |
|  | 6% CO | 33.1 |

Figure 9:
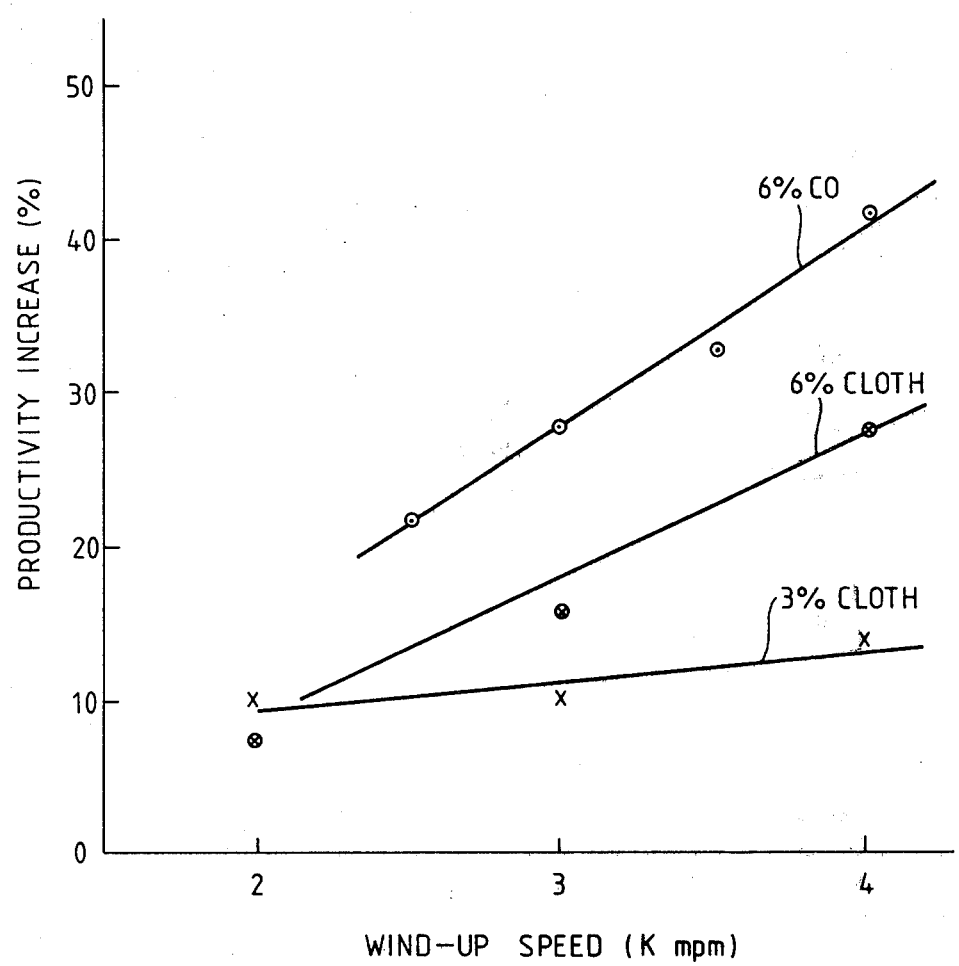
FIG. 9 is a plot of productivity increase versus wind-up speed for nylon filaments.

We have also found that another valuable criterion that can be used for LC polymer blends is the Instron extension. The results obtained are shown in FIG. 8 and Table 4. To avoid confusion the average extension of the two controls is given in FIG. 8 since Table 4 shows that it is not as sensitive a property as stress. The increase in extension is particularly interesting because it indicates the potential direct utility of the invention. Assuming that these Instron results could be translated into equivalent hot draw behaviour, and we have no reason to believe otherwise, the potential increase in productivity is shown in FIG. 9 (Results for 5 K mpm have been omitted since the control extension is not reliable).

The extension of 3% X7G blends in FIG. 8 is lower than for 3% CLOTH even though FIGS. 5 and 7 show that they both exert about the same WUS suppression. This is not surprising, since, the X7G blend fibres had sporadic 'blobs' of X7G due to the non-uniformity of the LC polymer in the blend. For this reason X7G has also been omitted from the productivity increases in FIG. 9.

It should be noted that in the Comparative Example, SANTICIZER lowers the extension.

I claim:

1. A process of melt spinning a fibre-forming thermoplastic polymer the improvement comprising adding to the fibre-forming thermoplastic polymer a small proportion of a polymer capable of forming an anisotropic melt in the temperature range at which the thermoplastic polymer may be melt spun together and the polymers are then melt spun together in intimate mixture at a minimum wind up speed of 1 kilometer per minute whereby in the process there is suppression of wind up speed compared with the process carried out in the absence of the added polymer.

2. A process as claimed in claim 1 in which the fibre-forming thermoplastic polymer is polyethylene terephthalate.

3. A process as claimed in claim 1 in which the fibre-forming thermoplastic polymer is polyethylene terephthalate and the added polymer is selected from either copoly chloro 1,4 phenylene ethylene dioxy 4,4' dibenzoate/terephthalate or a copolymer of 6-oxy-2 naphthoyl and p-oxybenzoyl moieties in the molar proportions 60%/40%.

4. A process as claimed in claim 1 in which the fibre-forming thermoplastic polymer is polyhexamethylene adipamide.

5. A process as claimed in claim 1 in which the fibre-forming thermoplastic polymer is polyhexamethylene adipamide and the added polymer is selected from either copoly chloro 1,4 phenylene ethylene dioxy 4,4' dibonzoate/terephthalate, a copolymer of 6-oxy-2 naphthoyl and p-oxybenzoyl moieties in the molar proportion 60%/40%, or copoly ethylene terephthalate/p-oxybenzoate.

6. A process as claimed in claim 1 in which the overlap of the anisotropic melt temperature range of the added polymer and the spinnable temperature range of the fibre-forming polymer is at least 5° C.

7. A process as claimed in claim 1 in which the added polymer is present in the mixture at a concentration of between 0.1% and 10% by weight.

* * * * *